(12) United States Patent
Kato et al.

(10) Patent No.: US 6,546,019 B1
(45) Date of Patent: Apr. 8, 2003

(54) DUPLEX MEMORY CONTROL APPARATUS

(75) Inventors: Yoshiharu Kato, Kawasaki (JP); Ryo Takajitsuko, Kawasaki (JP); Hidetoshi Iwasa, Yokohama (JP); Kiyofumi Mitsuze, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/150,232

(22) Filed: Sep. 10, 1998

(30) Foreign Application Priority Data

Mar. 9, 1998 (JP) ............................................ 10-057266

(51) Int. Cl.$^7$ ............................................ H04L 12/413
(52) U.S. Cl. ........................ 370/447; 370/462; 710/240; 710/308; 711/100
(58) Field of Search ................................ 370/216–221, 370/242, 244, 398, 412; 714/1, 2, 5, 6, 8, 9; 709/200–253; 711/105, 161–162, 158, 163; 710/240–242, 244, 308–309

(56) References Cited

U.S. PATENT DOCUMENTS

| | | | | |
|---|---|---|---|---|
| 4,371,754 A | * | 2/1983 | De et al. | |
| 4,630,197 A | * | 12/1986 | Khera | |
| 5,666,480 A | * | 9/1997 | Leung et al. | 714/1 |
| 5,802,546 A | * | 9/1998 | Chisholm et al. | 711/100 |
| 5,890,218 A | * | 3/1999 | Ogawa et al. | |
| 6,212,609 B1 | * | 4/2001 | Abramson et al. | 711/102 |
| 6,308,244 B1 | * | 10/2001 | Katayama | 365/230.03 |
| 6,477,607 B1 | * | 11/2002 | Jeong | 710/305 |

FOREIGN PATENT DOCUMENTS

| | | | |
|---|---|---|---|
| JP | 61-138354 | * | 6/1986 |
| JP | 62-93742 | * | 4/1987 |
| JP | 5-173936 | * | 7/1993 |

* cited by examiner

Primary Examiner—Seema S. Rao
Assistant Examiner—Inder Pal Mehra
(74) Attorney, Agent, or Firm—Staas & Halsey LLP

(57) ABSTRACT

A duplex memory control apparatus having a first control unit containing a first memory and a second control unit containing second memory, a first control unit and a second control unit connected to each other through a bus. The first control unit having a central processing unit writing write data in the first memory; a transmitter obtaining the write data to be written in the first memory by the central processing unit, a transmitter, when a write data can be specified based on another write data previously obtained, transmitting specific data smaller than a write data to the second control unit instead of the write data; a first bus mutually connecting the central processing unit, the first memory an the transmitter; a first direct memory access unit reading the write data held int eh first memory through the first but; a second bus connected with a first direct memory access unit; and an access limiter connected to the first bus and the second bus and limiting to use the first bus by the first direct memory access unit when the central processing unit uses the first bus. The second control unit having a data producing section receiving the specific data from the transmitter and producing an original write data based on the specific data; and a second direct memory access unit writing the original write data produced by the data producing section into the second memory.

9 Claims, 8 Drawing Sheets

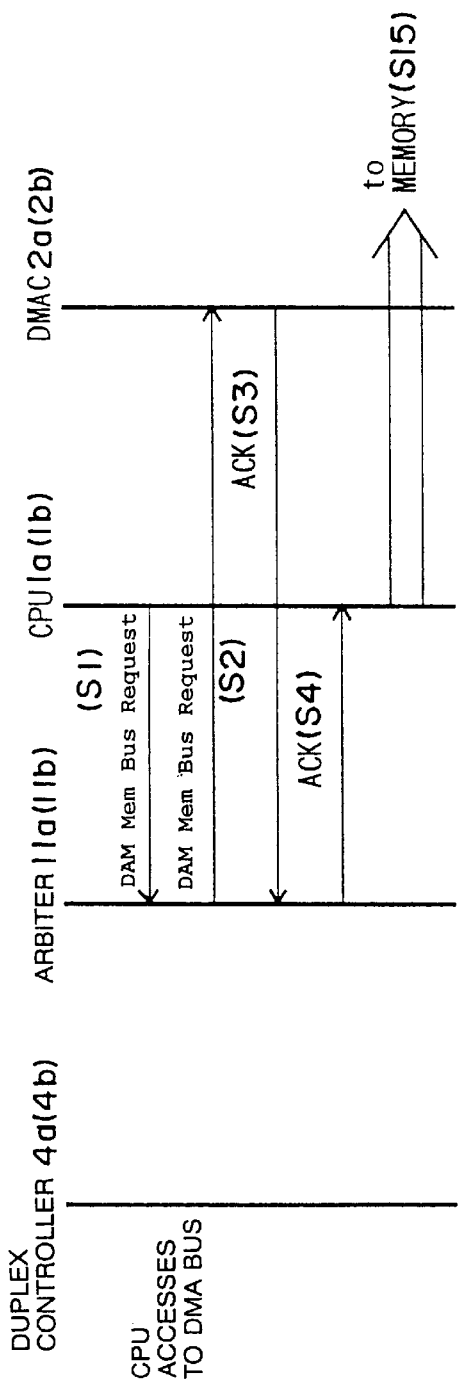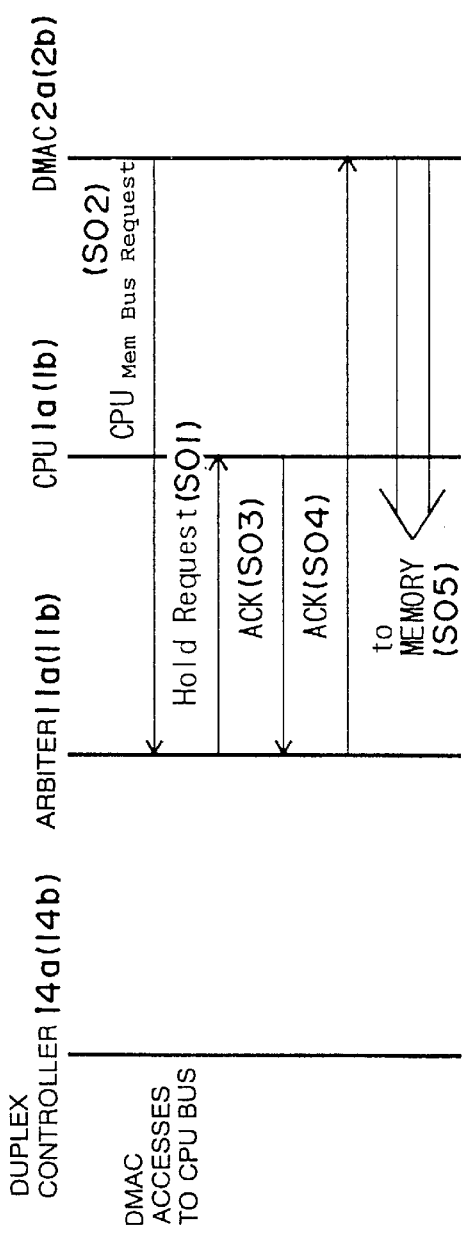

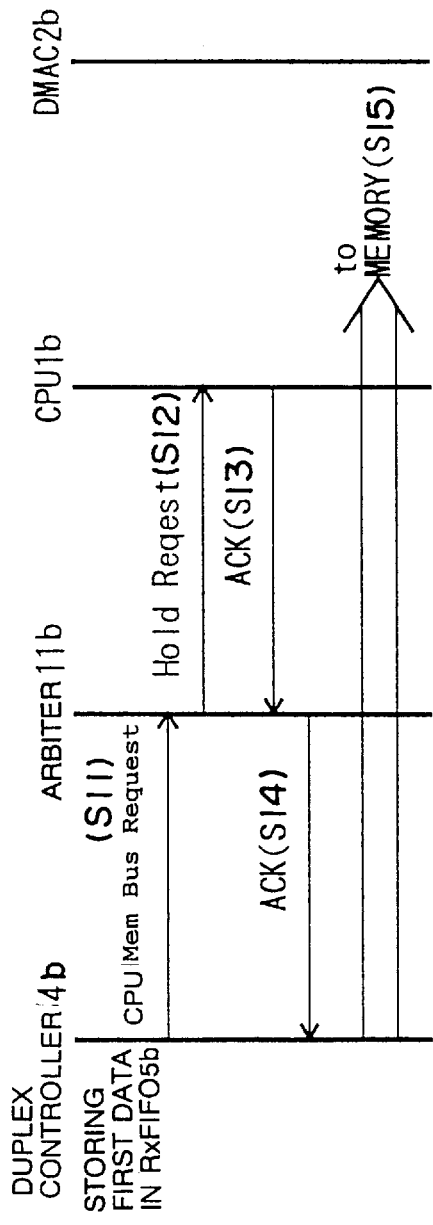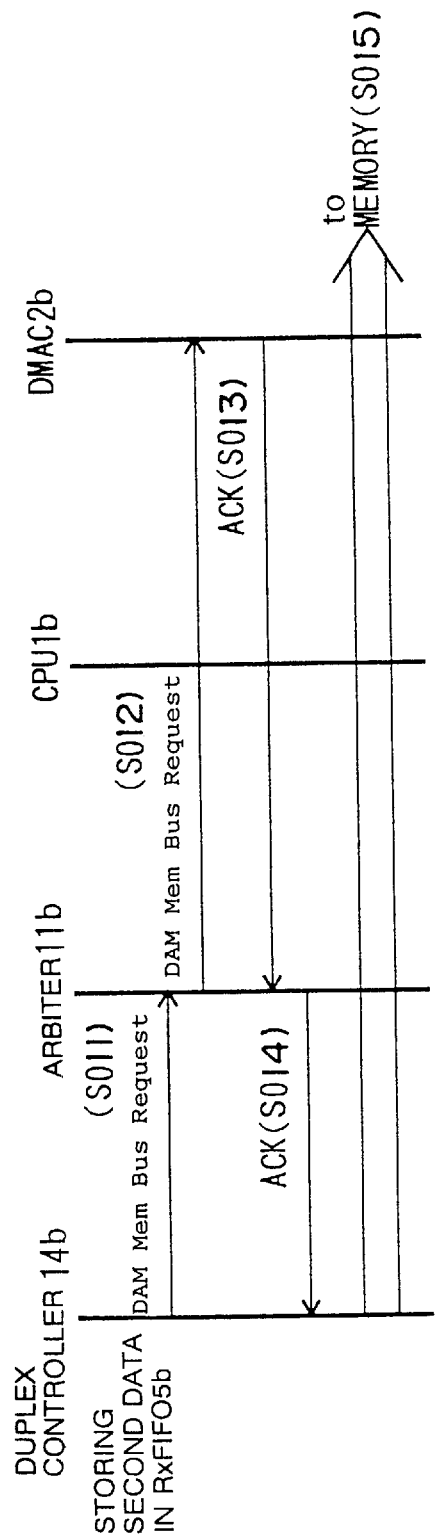

DUPLEX MEMORY CONTROL APPARATUS

BACKGROUND OF THE INVENTION

1. Field of the Invention

The present invention relates to a duplex memory control circuit used in a data exchange or the like.

2. Description of the Related Art conventionally, in the filed of data communication, a plurality of terminal units are connected to an exchange, and data transmitted between the terminal units are relayed by the exchange. As a result, the system down of the exchange during communication leads to the interruption of communication. Therefore, the system down of the exchange must be prevented as much as possible.

Under the above circumstances, the exchange is equipped with two data transmission paths of a main system (operating system) and a sub system (preliminary system). During usual operation, data is relayed by using the data transmission path of the main system. Then, when a fault occurs in the main system, the data transmission path is instantly switched over from the main system to the sub system, and the relay of data is continued by using the data transmission path of the sub system. In this way, it is prevented to interrupt communication caused by the system down of the exchange.

For achieving the above function, there are provided two control units for controlling the respective data transmission paths of the main system and sub system. The respective control units are designed such that the control unit of the sub system operates as the control unit of the main system when the main system is switched for the data transmission to the sub system. Therefore, memories equipped in the respective control units store the same data therein at all times (duplex memories).

FIG. 8 is a diagram showing a structural example of a control unit X of the main system and a control unit Y of the sub system (called "duplex memory control apparatus"), which is the above-described duplex memory. In FIG. 8, the control unit X includes a CPU 1a, a DMAC (direct memory access controller) 2a, a memory controller 3a connected with a memory 6a and a duplex controller 4a, and those are connected to each other through a bus B1. The CPU 1a and the DMAC 2a store data delivered from respective paths in the memory 6a. The control unit Y is connected to the control unit X through a bus and identical in construction with the control unit Y.

In the control units X and Y shown in FIG. 8, data to be processed by the CPU 1a is inputted to the bus B1 of the control unit X, the CPU 1a gives a write command to the memory controller 3a. In response to this, the memory controller 3a writes the data in the memory 6a. Then, the duplex controller 4a detects the above write command from the bus B1, stores the above data and its address (write position) in a TxFIFO 5a, and transfers the data and the address to the duplex controller 4b of the control unit Y.

The duplex controller 4b stores in the RxFIFO 5b with the data and the address which are received from the duplex controller 4a. In response to this, the DMAC 2b is activated and gives the write command of data stored in the RxFIFO 5b to the memory controller 3b. Then, the memory controller 3b writes the above data in the memory 6b in accordance with the address stored in the RxFIFO 5b. In this way, the same data is written at the same position in the respective memories 6a and 6b.

However, the duplex memory unit (control units X and Y) shown in FIG. 8 suffers from problems as stated below. That is, in the control units X and Y shown in FIG. 8, in the case where a data write command is issued to the CPU 1a, there is a case in which the CPU 1a must wait for data write processing if the DMAC 2a employs the bus B1. Also, there is a case in which the DMAC 2a accesses to the bus B1 during the data write processing by the CPU 1a, whereby the data write processing of the CPU 1a must be interrupted. As a result, there is a case in which a period of time is required for storing data in the memory 6a and also for transmitting the data to the control unit Y.

In addition, similarly, in the control unit Y, the CPU 1b and the DMAC 2b commonly employ the bus B2. Therefore, there is a case in which the waiting for or the interruption of the data write processing is caused by the DMAC 2b. Accordingly, there is a case in which a period of time is required until the data is stored in the memory 6a since the data is transmitted to the control unit 10b. In other words, there is a case in which a period of time is required until the contents in the memory 6a becomes identical with those in the memory 6b.

However, it takes time to make the contents in both the memories 6a and 6b identical with each other, therefore, when the system is switched from the main system to the sub system, there exists data that has been stored in the memory 6a but has not yet been stored in the memory 6b. As a result, there is a possibility in that a communication trouble occurs because the data is not stored in the memory 6b.

SUMMARY OF THE INVENTION

The present invention has been made in view of the above problems with the conventional unit, and therefore an object of the present invention is to provide a duplex memory control apparatus which is capable of making the contents stored in the respective memories identical with each other quicker than the conventional one.

In order to solve the above problems, a duplex memory control apparatus of the present invention comprises a first control unit containing a first memory and a second control unit containing second memory, the first control unit and the second control unit connected to each other through a bus. The first control unit includes a central processing unit writing write data in the first memory; a transmitter obtaining the write data to be written in the first memory by the central processing unit, the transmitter, when the write data can be specified based on another write data previously obtained, transmitting specific data smaller than the write data to the second control unit instead of the write data; a first bus mutually connecting the central processing unit, the first memory and the transmitter; a first direct memory access unit reading the write data held in the first memory through the first bus; a second bus connected with the first direct memory access unit; and an access limiter connected to the first bus and the second bus and limiting to use the first bus by the first direct memory access unit when the central processing unit uses the first bus. The second control unit includes a data producing section receiving the specific data from the transmitter and producing an original write data based on the specific data; and a second direct memory access unit writing the original write data produced by the data producing section into the second memory.

According to the present invention, in the first control unit, when the central processing unit writes the data in the first memory through the first bus, the use of the first bus by the first direct memory access unit is limited by the access limiter. Also, the transmitter obtains the data which is written in the first memory and judges whether the data can be specified by the data which has been obtained before, or not. In this situation, when the data can be specified, the specific data is transmitted to the second control unit instead of the data. In the second control unit, the data producing section produces the original data from the specific data received from the transmitter. Then, the second direct access memory unit writes the data produced by the data producing section in the second memory.

According to the present invention, since the first direct memory access unit can be prevented from accessing to the first bus when the central processing unit writes the data in the first memory, there is no case of waiting for or interrupting the data write processing. Also, the transmitter transfers the specific data to the second control unit instead of the data per se. Therefore, the amount of data which is transmitted from the first control unit to the second control unit can be decreased. Accordingly, a data transmission period, a period of time required until the same data is stored in the second memory since the data is stored in the first memory, can be reduced. Therefore, the contents stored in the first memory and the second memory can be made identical with each other quicker than the conventional one.

BRIEF DESCRIPTION OF THE DRAWINGS

These and other objects, features and advantages of this invention will become more fully apparent from the following detailed description taken with the accompanying drawings in which:

FIGS. 5A and 5B are sequential diagrams showing the operation of control units shown in FIG. 4, respectively;

FIGS. 7A and 7B are sequential diagrams showing the operation of the control units shown in FIG. 2, respectively.

DETAILED DESCRIPTION OF THE PREFERRED EMBODIMENTS

Now, a description will be given in more detail of a preferred embodiment of the present invention with reference to the accompanying drawings.
(Structure of Exchange)

Figure 1:
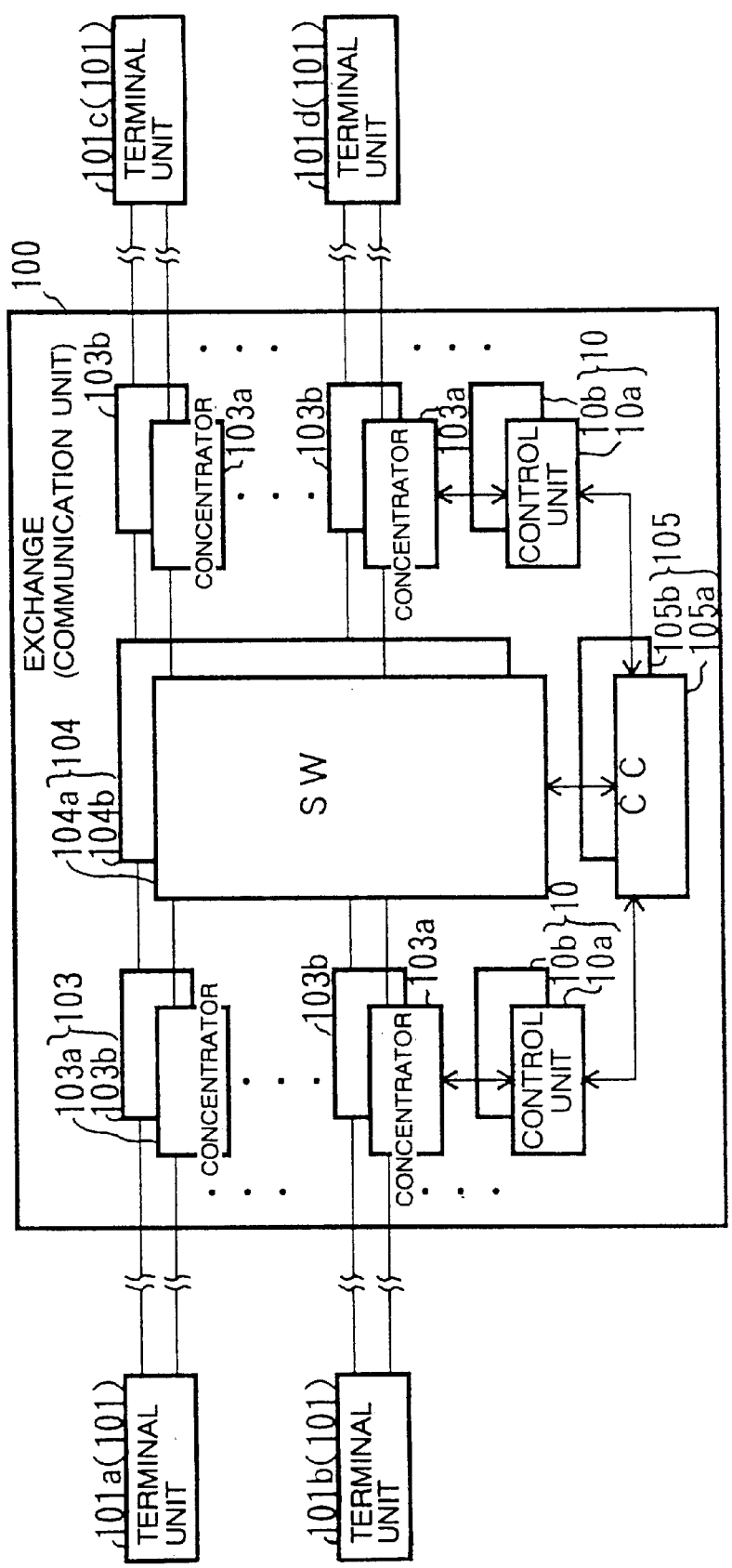
FIG. 1 is a structural diagram showing an exchange equipped with a duplex memory control apparatus according to an embodiment of the present invention.

FIG. 1 is a structural diagram showing an example of a packet exchange 100 (corresponding to a communication unit of the present invention) having a duplex memory control apparatus according to an embodiment of the present invention. In FIG. 1, the exchange 100 includes a plurality of concentrators 103 each for receiving a plurality of lines therein, a plurality of control units 10 connected in association with the respective concentrators 103, a switch (SW) 104 connected with the respective concentrators 103, and a central controller (CC) connected with the respective concentrators 103, the respective control units 10 and the SW 104. A plurality of subscribers' terminal units (hereinafter referred to as "terminal units") 101 are connected to the concentrators 103 through the lines (incidentally, terminal units 101a through 101d shown in FIG. 1).

Each of the concentrators 103 conducts a header transforming process, multiplexing/separating processes, etc. for a packet transmitted through the lines received by the corresponding concentrator 103 in accordance with a command from each of the control units 10. Each of the control units 10 controls the operation of the concentrators 103 assigned to the corresponding control unit 10.

The SW 104 is inputted with a packet from the concentrators 103. Then, the SW 104 switches the packet in accordance with the header information of the packet inputted to the SW 104. The CC 105 controls the operation of the respective concentrators 103, the respective control units 10 and the SW 104 in accordance with the manager's setting of the exchange 100.

The exchange 100 is a two-system structure consisting of the main system and the sub system so that even if a fault occurs in the device during communication between the terminal units 101, the communication is smoothly continued. In other words, respective concentrators 103a, respective control units 10a, a SW 104a and a CC 105a shown in FIG. 1 constitute the main system, and respective concentrators 103b, respective control units 10b, a SW 104b and a CC 105b constitute the sub system. Each pair of the control units 10a and the control units 10b constitutes a duplex memory control apparatus according to the present invention.

The main system and the sub system are identical in construction with each other, and if no fault occurs in both of those systems, data is transmitted through both the systems, and only data transmitted through the main system is transmitted to its destination. In other word, the main system functions as a main line. On the other hand, if a fault occurs in the main system, the main line is instantaneously switched from the main system to the sub system. In this situation, the sub system succeeds to all of the operations (including the state) which have been performed by the main system immediately before the fault occurs and operates instead of the main system. As a result, if a fault occurs in the main system during communication, data transmitted through the sub system is transmitted to its destination. In this way, even if a fault occurs in the main system, the communication continues as if no fault occurs viewed from the terminal unit 101 side.
(Construction of Duplex Memory Control Apparatus)

Figure 2:
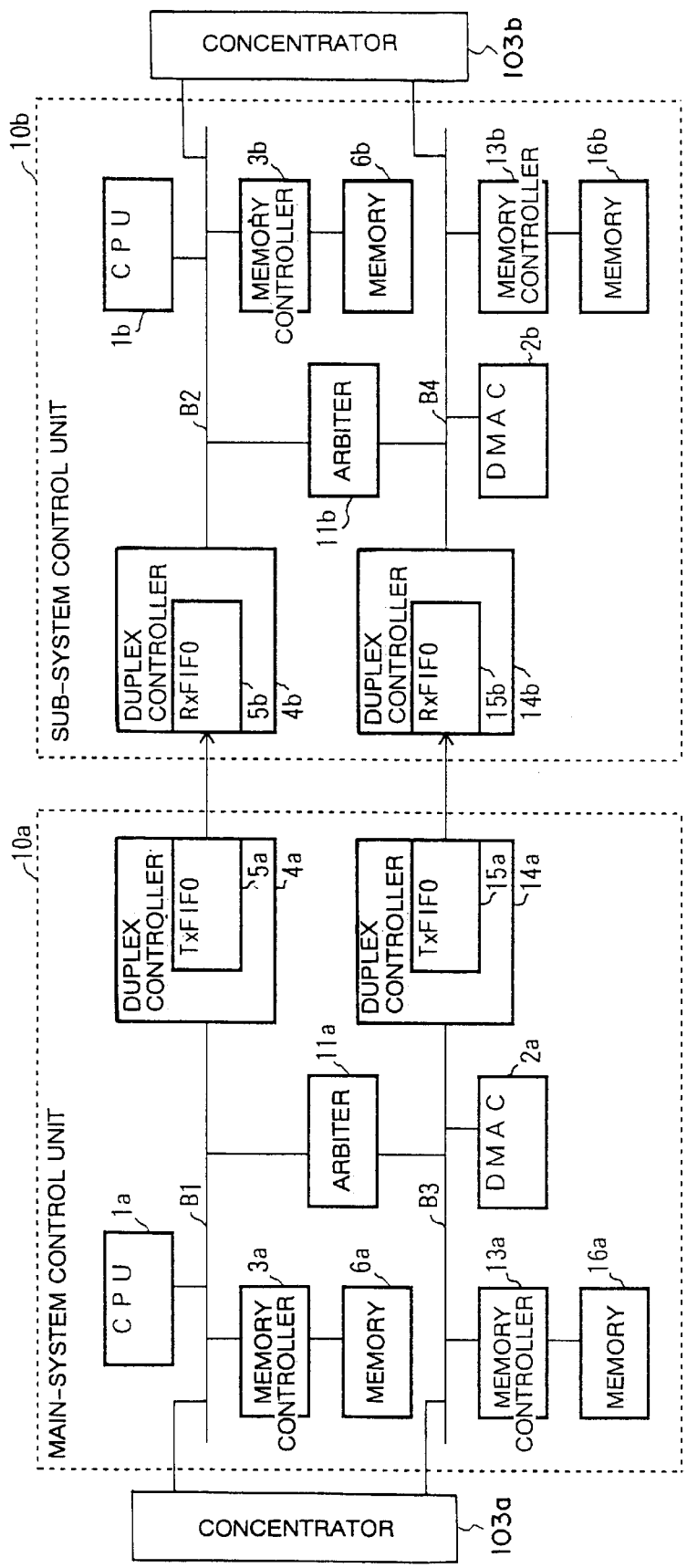
FIG. 2 is a structural diagram showing the duplex memory control apparatus shown in FIG. 1.
Figure 8:
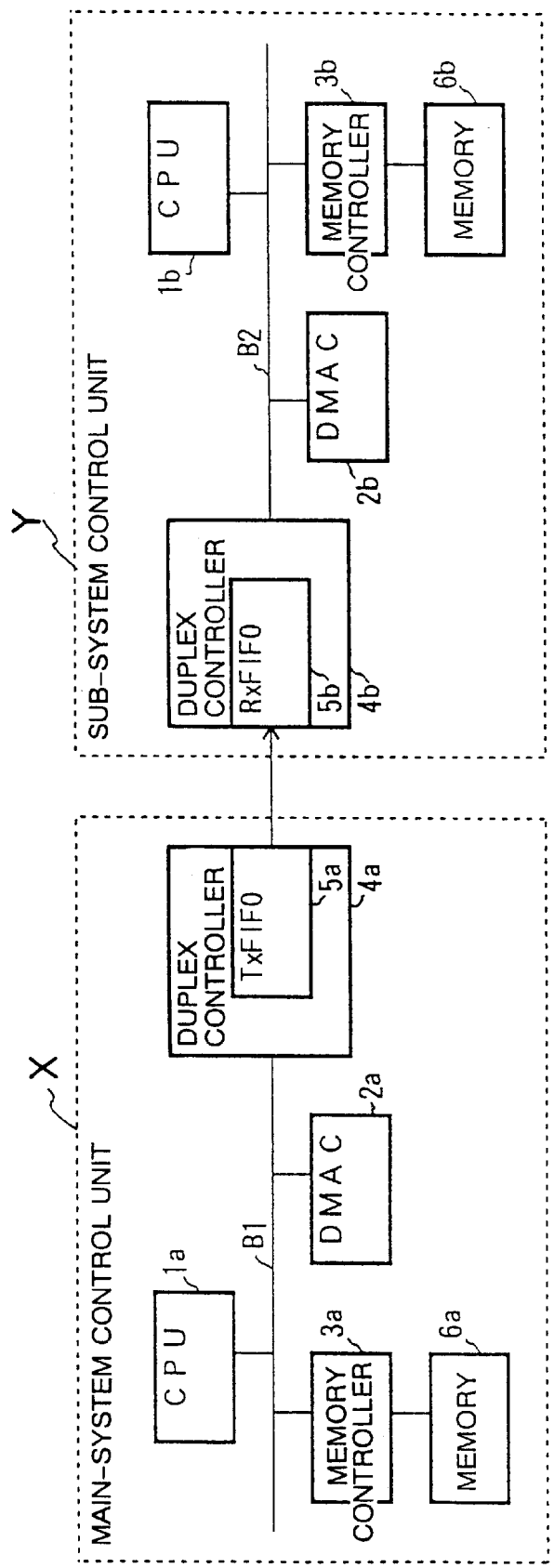
FIG. 8 is a structural diagram showing a conventional duplex memory control apparatus.

FIG. 2 is a structural diagram showing the control units 10a and 10b shown in FIG. 1 (the duplex memory control apparatus according to the embodiment of the present invention). As shown in FIG. 2, the duplex memory control apparatus is provided with the control unit 10a and the control unit 10b which are connected to each other through a bus. In FIG. 2, the same structural parts as those of the conventional example are indicated by identical reference symbols (refer to FIG. 8).

The control unit 10a includes a CPU (central processing unit) 1a, a memory controller 3a connected with the memory 6a, and a duplex controller 4a, and those are connected to each other through a bus B1 (CPU bus). Also, the control unit 10a includes a DMAC (direct memory access controller) 2a, a memory controller 13a connected with a memory 16a, and a duplex controller 14a, and those are connected to each other through a bus B3 (DMA bus).

The control unit 10a also includes an arbiter 11a connected to both of the buses B1 and B3. The bus B1 is connected to the concentrators 103a so as to receive the header information of the packet from the concentrators 103a. The bus B2 receives user data stored in the information section (payload) of the packet from the concentrators 103.

The control unit 10a corresponds to the first control unit of the present invention, the bus B1 corresponds to the first bus of the present invention, and the CPU 1a corresponds to the central processing unit of the present invention. Also, the memory 6a corresponds to the first memory of the present invention, and the duplex controller 4a corresponds to the transmitter of the present invention. Further, the DMAC 2a corresponds to the first direct access memory of the present invention, the bus B3 corresponds to the second bus of the present invention, and the arbiter 11a corresponds to the access limiter of the present invention. In addition, the memory 16a corresponds to the third memory of the present invention, and the duplex controller 14a corresponds to the second transmitter of the present invention.

The CPU 1a controls the concentrators 103a, the memory controller 3a and so on by the execution of control program recorded in the memory 6a. For example, the CPU 1a gives control commands for the header transforming process, the multiplexing/separating processes and so on of the packet to the concentrators 103a. Also, when the header information of the packet is transmitted from the concentrators 103a to the bus B1, the CPU 1a gives the header information write command to the memory controller 3a. The CPU 1a also gives the data read command held in the memories 6a and 16a to the memory controllers 3a and 13a.

The memory controller 3a conducts the data write/read processes with respect to the memory 6a in accordance with the command from the CPU 1a or the DMAC 2a. The memory 6a includes a RAM (random access memory), a ROM (read only memory), a magnetic disc, a magneto-optic disc or the like, and holds the control program for the CPU 1a and data used when executing the control program. The memory 6a is also used as the operating area of the CPU 1a. Further, the memory 6a forms an area where the header information of the packet is stored, the packet inputted to the concentrators 103a.

The DMAC 2a gives the user's data write command to the memory controller 13a when the user data of the packet is transmitted from the concentrators 103a to the bus B3. The DMAC 2a also gives the read command of data stored in the memories 6a and 16a to the memory controllers 3a and 13a in accordance with an external command (for example, a command from the CC 105a).

The memory controller 13a conducts the data writing/reading processes with respect to the memory 16a in accordance with a command from the CPU 1a or the DMAC 2a. The memory 16a is mainly used as an area storing with the user data of the packet.

The duplex controller 4a monitors the write command issued when the header information is transmitted from the concentrators 103a to the bus B1. Then, the duplex controller 4a, when detecting the write command, obtains the header information from the bus B1, and then transmits the header information to the control unit 10b. On the other hand, the duplex controller 4b, when the user data is transmitted from the concentrators 103a to the bus B3, obtains the user data from the bus B3, and then transmits the user data to the control unit 10b.

The control unit 10b includes a CPU 1b, a memory controller 3b connected with a memory 6b, and a duplex controller 4b, and those are connected to each other through a bus B2 (CPU bus). Also, the control unit 10b includes a DMAC 2b, a memory controller 13b connected with the memory 16b, and a duplex controller 14b, and those are connected to each other through a bus B4 (DMA bus).

The control unit 10b also includes an arbiter 11b connected to both of the buses B2 and B4. The duplex controller 4b is connected to the duplex controller 4a through the bus, and the duplex controller 14b is connected to the duplex controller 14a through the bus. With this structure, the controller 10b is connected to the controller 10a.

The control unit 10b corresponds to the second control unit of the present invention, the duplex control unit 4b corresponds to the data producing unit of the present invention, the memory 6b corresponds to the second memory of the present invention, and the DMAC 2b corresponds to the second direct memory access unit of the present invention. Also, the duplex controller 14b corresponds to the second data producing unit of the present invention, the memory 16b corresponds to the fourth memory of the present invention, and the bus B2 corresponds to the third bus of the present invention. Further, the CPU 1b corresponds to the second central processing unit of the present invention, the bus B4 corresponds to the fourth bus of the present invention, and the arbiter 11b corresponds to the second access limiter of the present invention.

The CPU 1b controls the concentrators 103b which act as the main system instead of the concentrators 103a when a fault occurs in the main system. The duplex controller 4b receives the header information from the duplex controller 4a and then sends out the header information to the bus B2. The duplex controller 14b receives the user data from the duplex controller 14a and then sends out the user data to the bus B4.

The DMAC 2b gives the head information write command to the memory controller 3b when the header information is sent out from the duplex controller 4b to the bus B1. The DMAC 2b also gives the user's data write command to the memory controllers 13b when the user data is sent out from the duplex controller 14b to the bus B3. In this manner, the DMAC 2b conducts the write control for the header information and user's data The memory controller 3b writes the header information in the memory 6b in accordance with the write command from the DMAC 2b. Also, the memory controller 13b writes the user data in the memory 16b in accordance with the write command from the DMAC 2b. This makes it possible that the control unit 10b operates instead of the control unit 10a when a fault occurs in the main system.

The CPUs 1a and 1b of this embodiment are so-called 32-bit CPUs, and their clock frequency is 3 MHZ. Each of the buses B1 to B4 includes an address bus (32 bits), a data bus (32 bits) and a control bus. Although the clock frequency of the CPUs 1a and 1b, and the transmission rate (bps) of the respective buses B1 to B4 are not limited, it is preferable to balance the processing capacity of the CPUs 1a and 1b, and the transmission capacity of the respective buses B1 to B4.

(Duplex Controller)

Subsequently, the detailed structure of the duplex controllers 4a and 14a will be described. Since the respective duplex controllers 4a and 14a are identical in construction with each other, the duplex controller 4a will be exemplified.

Figure 3:
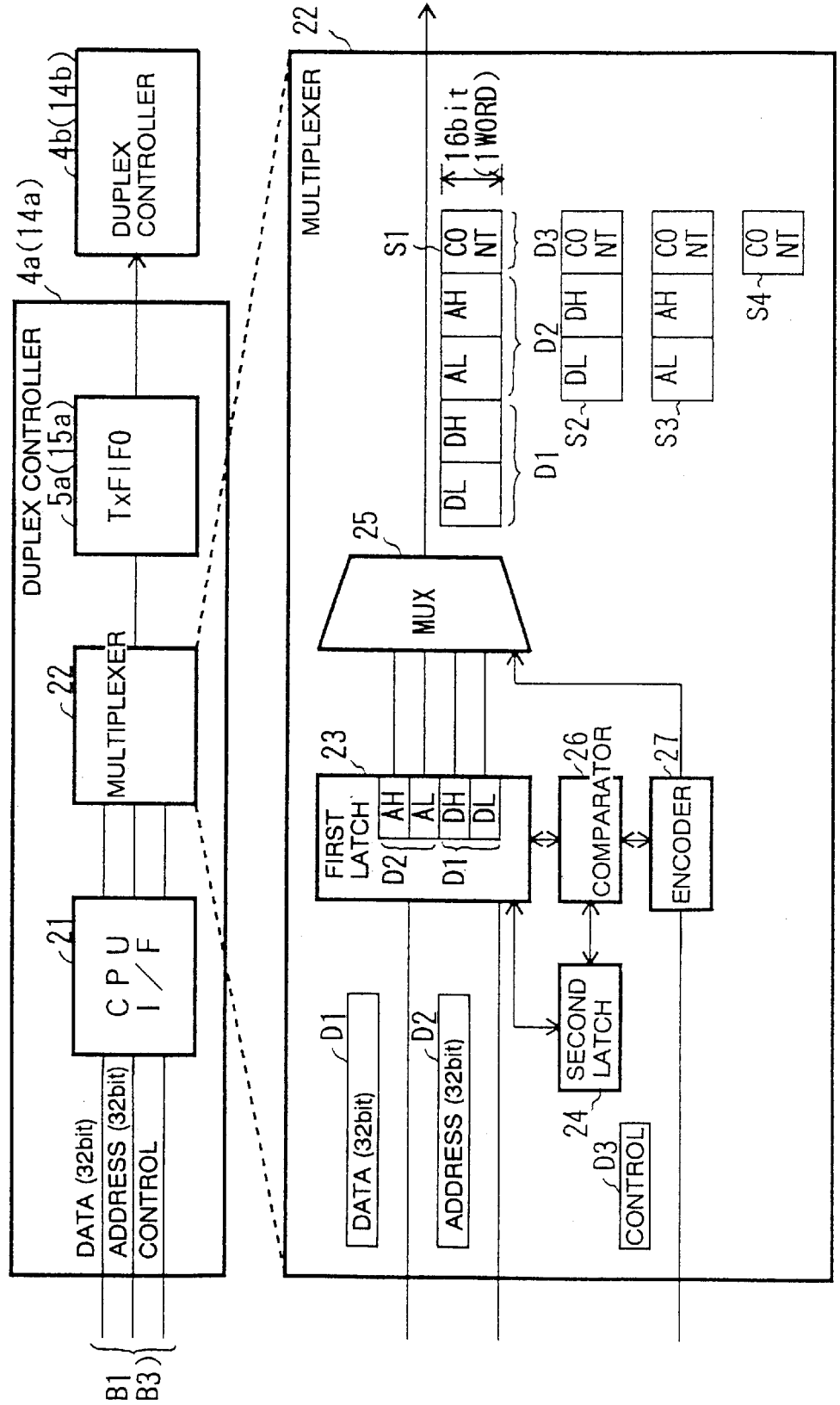
FIG. 3 is a structural diagram showing a duplex controller shown in FIG. 2.

FIG. 3 is a structural diagram showing the duplex controller 4a. In FIG. 3, the duplex controller 4a includes a CPU interface (CPU I/F) 21 connected to the bus B1 shown in FIG. 2, a multiplexer 22 connected to the CPU I/F 21 through the data bus, the address bus and the control bus, and a TxFIFO (Tx first in first out) 5a connected to the multiplexer 22 through the bus.

The CPU I/F 21 takes data (called "first data") relating to the header information which is written in the memory 6a by the CPU 1a from the bus B1 and then latches the data. The first data includes write data (header information per se) D1 (32 bits) which is in fact written in the memory 6b, address data D2 (32 bits) indicative of the write position of the write data D1 and control data (write command) D3 for the write data D1.

The multiplexer 22 receives the first data from the CPU I/F 21 and transforms the first data into a format suited for transmitting the first data to the control unit 10b. Therefore, the multiplexer 22 includes a first latch 23, a second latch 24 and a multiplexer (MUX) 25, a comparator 26 and an encoder 27 as shown in FIG. 3.

The first latch 23 receives the write data D1 and the address data D2 of the first data from the CPU I/F 21. The first latch 23 holds the write data D1 and the address data D2 in a state where they are divided for each of words (in this example, 16 bits). That is, the first latch 23 holds the write data D1 in the states of data high (DH) and data low (DL), and also holds the address data D2 in the states of address high (AH) and address low (AL).

When the write data D1 and the address data D2 which form the next first data are inputted to the first latch 23, the second latch 24 receives write data D1 and address data D2 which form previous first data from the first latch 23 to hold those data therein.

The comparator 26 compares the write data D1 held in the first latch 23 with the write data D1 held in the second latch 24. In this situation, in the case where the write data D1 held in the first latch 23 is data obtained by subjecting the write data D1 held in the second latch 24 to one increment (called "I write data"), or in the case where the write data is data obtained by subjecting the write data D1 held in the second latch 24 to one decrement (called "D write data"), the comparator 26 notifies the encoder 27 of this fact.

Also, the comparator 26 compares the address data D2 held in the first latch 23 with the address data D2 held in the second latch 24. In this situation, in the case where the address data D2 held in the first latch 23 is data obtained by subjecting the address data D2 held in the second latch 24 to one increment (called "I address data"), in the case where the address data D2 is data obtained by subjecting the address data D2 held in the second latch 24 to one decrement (called "D address data"), or in the case where the address data D2 is identical with the address data D2 held in the second latch 24 (called "S address data"), the comparator 26 notifies the encoder 27 of this fact.

The encoder 27 is inputted with the control data D3 of the header information data. The encoder 27 encodes the inputted control data D3. In this situation, when the encoder 27 receives information that the address data D2 is any one of I, D and S address data from the comparator 26, the encoder 27 encodes the data together with the control data D3. Then, the encoder 27 gives the encoded control data D3 to the MUX 25.

Likewise, when the encoder 27 receives information that the write data D1 is I write data or D write data from the comparator 26, the encoder 27 encodes the data together with the control data D3. Then, the encoder 27 gives the encoded control data D3 to the MUX 25.

The MUX 25 takes the write data D1 and/or the address data D2 from the first latch 23 in accordance with the control data D3 received from the encoder 27 and then multiplexes those data and the control data D3.

In the case where the control data D3 received from the encoder 27 consists of only the control data D3 outputted from the CPU/IF 21, the MUX 25 receives all of the write data D1 and the address data D2 from the second latch 24, and then multiplexes those data together with the control data D3. As a result, data S1 shown in FIG. 3 is outputted from the MUX 25 and then held in the TxFIFO 5a.

On the contrary, in the case where the control data D3 received from the encoder 27 includes the I or D write data, the MUX 25 receives only the write data D1 from the second latch 24, and then multiplexes the data together with the control data D3. As a result, the data S2 shown in FIG. 3 is outputted from the MUX 25 and then held in the TxFIFO 5a.

In the case where the control data D3 received from the encoder 27 consists of any one of the I, D and S write data, the MUX 25 receives only the address data D2 from the first latch 23, and then multiplexes those data together with the control data D3. As a result, data S3 shown in FIG. 3 is outputted from the MUX 25 and then held in the TxFIFO 5a.

On the contrary, in the case where the control data D3 received from the encoder 27 includes I or D write data, and includes any one of I, D and S address data, the MUX 25 does not receive data from the second latch 23, and outputs only the control data D3. In other words, data S4 shown in FIG. 3 is outputted from the MUX 25 and then held in the TxFIFO 5a.

The TxFIFO 5a holds the data S1 through S4 received from the MUX 25 of the multiplexer 22, and then sends the respective data S1 through S4 to the multiplex controller 4b in the order of storing those data S1 through S4 in the TxFIFO 5a. As a result, the first data is transmitted from the multiplex controller 4a of the main system to the multiplex controller of the sub system.

As described above, when the first data transmitted to the multiplex controller 4b can be specified from the previous first data, the first data is transmitted in a state where the write data D1 and/or the address data D2 is omitted therefrom. Accordingly, the amount of data transmitted from the main system to the sub system can be reduced, and the transmission period can be shortened.

Figure 4:
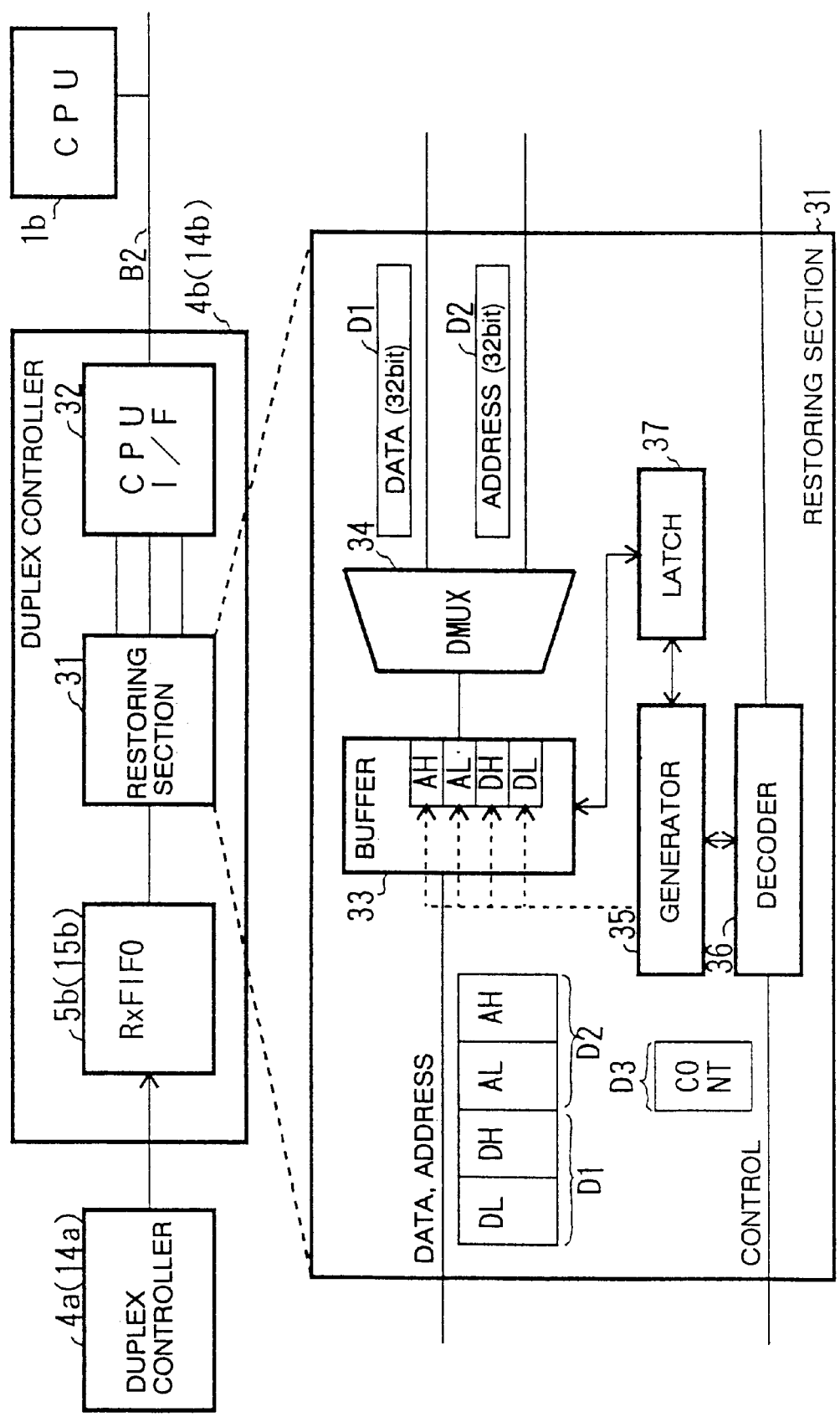
FIG. 4 is a structural diagram showing the duplex controller shown in FIG. 2.

FIG. 4 is a structural diagram showing the duplex controller 4b (14b) shown in FIG. 2. In FIG. 4, the duplex controller 4b restores the first data transmitted from the duplex controller 4a to the original format, and then sends the restored first data to the bus B2. Therefore, the duplex controller 4b includes an RxFIFO 5b connected with the duplex controller 4a, a restoring section 31 connected to the RxFIFO 5b through a bus, and a CPU I/F 32 connected to the restoring section 31 and also connected to the bus B2.

The RxFIFO 5b holds the first data (data S1 through S4) transmitted from the duplex controller 4a and gives the respective first data to the restoring section 31 in the data stored order.

The restoring section 31 restores the first data (data S1 to S4) received from the RxFIFO 5b to the original data format, and then sends the restored first data to the CPU I/F 32. Therefore, the restoring section 31 includes a buffer 33, a DMUX 34, a generator 35, a decoder 36 and a latch 37.

The buffer 33 is inputted with the write data D1 and the address data D2 included in the data S1 through S3 among the data S1 through S4 outputted from the RxFIFO 5b. The buffer 33 holds those write data D1 and address data D2.

The latch 37 takes the contents of the previous write data D1 and the address data D2 out of the buffer 33 when new write data D1 and address data D2 are inputted to the buffer 33, and then holds those data therein.

The decoder 36 is inputted with the control data D3 included in the data S1 through S4 outputted from the RxFIFO 5*b*. The decoder 36 decodes the inputted control data D3 and gives the decoded result to the generator 35.

The generator 35 receives the decoded result of the control data D3 from the decoder 36. Then, the generator 35 refers to the contents of the previous write data D1 and the address data D2 which are held in the latch 37 in accordance with the decoded result to generate the write data D1 and/or the address data D2, and gives those data to the buffer 33.

In particular, the generator 35 conducts different processing depending on which of the data S1 through S4 is inputted to the decoder 31. In other words, the generator 35 does not conduct data generating processing if the data inputted to the restoring section 31 is data S1 (refer to FIG. 3).

The generator 35 conducts the following processing if the data inputted to the restoring section 31 is data S2. That is, if the decoded result of the control data D3 includes information that the inputted data is I or D address data, the generator 35 refers to the address data D2 held in the latch 37 to generate address data D2 obtained by subjecting the address data D2 to 1 increment/decrement and gives the address data D2 to the buffer 33.

The generator 35 conducts the following processing if the data inputted to the restoring section 31 is data S3. That is, if the decoded result of the control data D3 includes information that the inputted data is I or D write data, the generator 35 refers to the write data D1 held in the latch 37 to generate write data D1 obtained by subjecting the write data D1 to 1 increment/decrement and gives the write data D1 to the buffer 33.

The generator 35 conducts the following processing if the data inputted to the restoring section 31 is data S4. That is, if the decoded result of the control data D3 includes information that the inputted data is I address data and I write data, the generator 35 generates write data D1 and address data D2 obtained by subjecting the write data D1 and the address data D2 held in the latch 37 to 1 increment, respectively, and gives those data to the buffer 33.

Then, when the decoded result of the control data D3 includes information that the inputted data is D address data and D write data, the generator 35 generates write data D1 and address data D2 obtained by subjecting the write data D1 and the address data D2 held in the latch 37 to 1 decrement, respectively, and gives those data to the buffer 33.

When the decoded result of the control data D3 includes information that the inputted data is I address data and D write data, the generator 35 generates address data D2 obtained by subjecting the address data D2 held in the latch 37 to one increment and write data D1 obtained by subjecting the write data D1 held in the latch 37 to one decrement, respectively, and gives those data to the buffer 33.

When the decoded result of the control data D3 includes information that the inputted data is D address data and I write data, the generator 35 generates address data D2 obtained by subjecting the address data D2 held in the latch 37 to one decrement and write data D1 obtained by subjecting the write data D1 held in the latch 37 to one increment, and gives those data to the buffer 33.

When the decoded result of the control data D3 includes information that the inputted data is S address data and D write data, the generator 35 generates the address data D2 held in the latch 37 and write data D2 obtained by subjecting the write data D1 held in the latch 37 to one decrement, and gives the write data D2 and the address data D2 held in the latch 37 to the buffer 33.

When the decoding result of the control data D3 includes information that the inputted data is S address data and I write data, the generator 35 generates the address data D2 held in the latch 37 and write data D2 obtained by subjecting the write data D1 held in the latch 37 to one increment, and gives the write data D2 and the address data D2 held in the latch 37 to the buffer 33.

Accordingly, after processing by the generator 35 has been completed, in the buffer 33, the write data D1 and the address data D2 held in the first latch 23 (refer to FIG. 3) of the multiplexer 22 are restored. Then, the restored write data D1 and address data D2 are held in the latch 37.

The DMUX 34 receives the restored write data D1 and address data D2 from the buffer 33, and separates those data from each other to output them. Thereafter, the write data D1, the address data D2 and the control data D3 are sent out into the bus B2.

In response to this, the DMAC 2*b* (refer to FIG. 2) gives the write command of the write data D1 to the memory controller 3*b* in accordance with the control data D3. The memory controller 3*b* writes the write data D1 in the memory 6*b* in accordance with the address data D2. As a result, the memory 6*b* holds the same data at the same address as those of the memory 6*a* in the main system control unit 10*b*.

The duplex controllers 14*a* and 14*b* conduct the same operation as that of the above-described duplex controllers 4*a* and 14*a* with respect to the user data written in the memory 16*a* by the DMAC 2*a*. As a result, the same data as that in the memory 16*a* is written at the same address in the memory 16*b*.

(Arbiter)

The respective arbiters 11*a* and 11*b* shown in FIG. 2 are, for example, an IC (integrated circuit) or an LSI. Hereinafter, the operation of the respective arbiters 11*a* and 11*b* will be described.

In the case where the CPU 1*a* accesses to the memory 6*a* (CPU bus memory), the arbiter 11*a* prohibits an access to the bus B1 (CPU bus) of the DMAC 2*a*, that is, the use of the bus B1 by the DMAC 2*a*. On the other hand, in the case where the DMAC 2*a* accesses to the memory 16*a* (DMA bus memory), the arbiter 11*a* prohibits an access to the bus B2 (DMA bus) of the CPU 1*a*, that is, the use of the bus B2 by the CPU 1*a*.

Also, the arbiter 11*a* controls an access to the bus B3 (memory 16*a*) of the CPU 1*a* and an access to the bus B1 (memory 6*a*) of the DMAC 2*a*. FIG. 5A is a sequential diagram showing the operation when the CPU 1*a* accesses to the memory 16*a*, and FIG. 5B is a sequential diagram showing the operation when the DMAC 2*a* accesses to the memory 6*a*.

As shown in FIG. 5A, when data is read from the memory 16*a*, the CPU 1*a* gives a message "DMA Men Bus Request" that requests an access to the memory 16*a* to the arbiter 11*a* (S1). Upon receiving "DMA Men Bus Request" from the CPU 1*a*, the arbiter 11*a* transfers this message to the DMAC 2*a* (S2).

The DMAC 2*a*, upon receiving "DMA Men Bus Request" from the arbiter 11*a*, transfers its confirmation message "ACK" to the arbiter 11*a* (S3), releases the bus B4 used by the DMAC 2*a* assuming that the CPU 1*a* accesses to the memory 16*a*, and stops the use of the bus B4 for a given period of time (processing is interrupted). Upon receiving "ACK" from the DMAC 2*a*, the arbiter 11*a* transfers it to the CPU 1*a* (S4).

The CPU 1*a*, upon receiving "ACK" from the arbiter 11*a*, issues a data read command assuming that the DMAC 2*a* uses no bus B4, and gives the command to the memory controller 13*a* through the arbiter 11*a* (S5). As a result, desired data is read out from the memory 16*a* and given to the CPU 1*a*.

On the other hand, as shown in FIG. 5B, when data is read from the memory 6a, the DMAC 2a gives a message "CPU Men Bus Request" that requests an access to the memory 6a to the arbiter 11a (S01). Upon receiving "CPU men Bus Request" from the DMAC 2a, the arbiter 11a transfers a message "Hold Request" to the CPU 1a (S02).

The CPU 1a, upon receiving "Hold Request" from the arbiter 11a, transfers its confirmation message "ACK" to the arbiter 11a (S03), and releases the bus B2 used by the CPU 1a assuming that the DMAC 2a accesses to the memory 6a. Upon receiving "ACK" from the CPU 1a, the arbiter 11a transfers it to the DMAC 2a (S04).

The DMAC 2a, upon receiving "ACK" from the arbiter 11a, issues a data read command assuming that the CPU 1a uses no bus B2, and gives the command to the memory controller 3a through the arbiter 11a (S05). As a result, desired data is read out from the memory 6a and given to the DMAC 2a.

In this way, the data read process from the memory 16a by the CPU 1a is prohibited, and a delay of the data read processing from the memory 6a by the DMAC 2a is prevented.

In the case where the CPU 1b accesses to the memory 16b, the same operation as the operation shown in FIGS. 5A and 5B is conducted in the control unit 10b even when the DMAC 2b accesses to the memory 6b, whereby the delay of the data read process is prevented.

Figure 6:
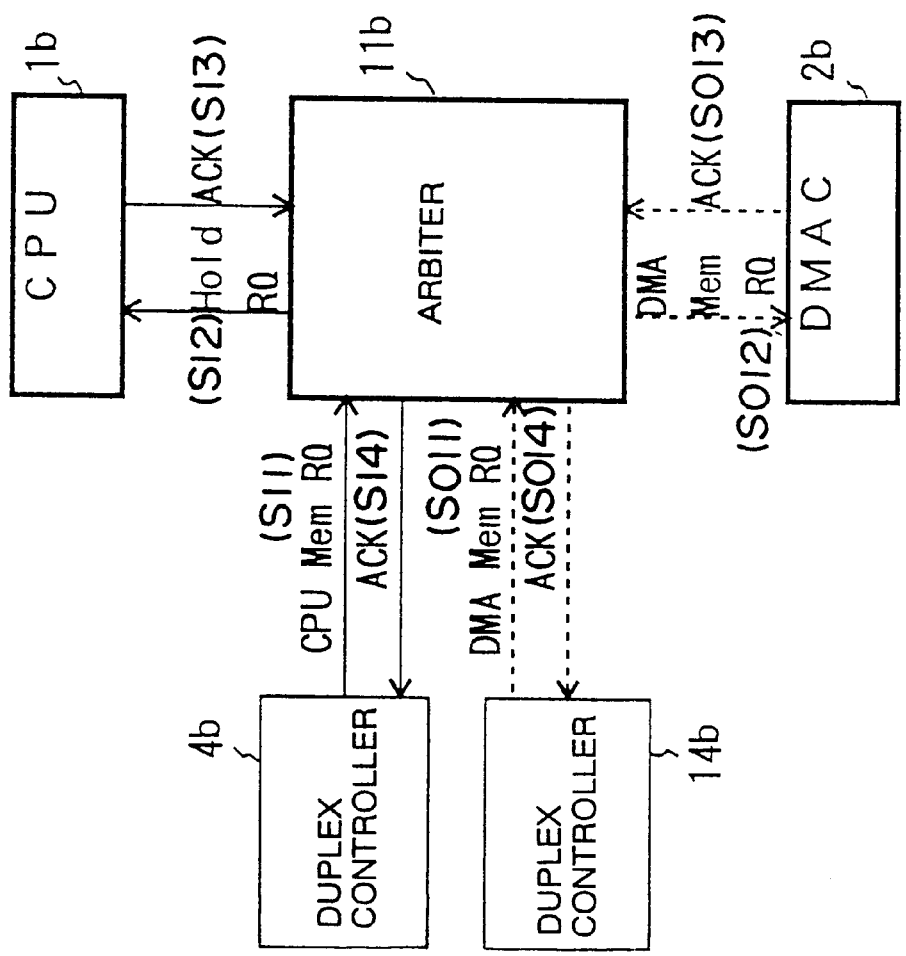
FIG. 6 is an explanatory diagram showing a message which is transmitted and received by an arbiter shown in FIG. 2.

The arbiter 11b also limits the operation of the CPU 1b during the control of header information writing by the DMAC 2b. FIG. 6 is an explanatory diagram showing a message which is transmitted and received by an arbiter 11b, and FIG. 7A is a sequential diagram showing the operation of the arbiter 11b when the first data (data relating to the header information) sent out of the duplex control unit 4b is written in the memory 6b whereas FIG. 7B is a sequential diagram showing the operation of the arbiter 11b when the second data (data relating to the user data) sent out from the duplex control unit 14b is written in the memory 16b.

As shown in FIGS. 6 and 7A, in the case where the duplex controller 4b sends out the first data stored in the RxFIFO 5b (refer to FIG. 2) to the bus B2, the duplex controller 4b gives the message "CPU Men Bus Request" indicating that data is written in the memory 6b to the arbiter 11b through the bus B2 (S11).

In response to this, the arbiter 11b gives the message "Hold Request" for stopping the operation of the CPU 1b which is now operating is given to the CPU 1b (S12). Then, the CPU 1b gives the confirmation message "ACK" for "Hold Request" to the arbiter 11b (S13), releases the bus B2 used by the CPU 1b, and stops the use of the bus B2 for a predetermined period of time (processing is interrupted).

The arbiter 11b, upon receiving "ACK" from the CPU 1b, transfers "ACK" to the duplex controller 4b (S14). Upon receiving "ACK" from the arbiter 11b, the duplex controller 4b sends out the first data to the bus B2 assuming that the CPU 1b uses no bus B2.

In response to this, the DMAC 2b receives the control data D3 (write command) through the arbiter 11b, and gives the write command of the write data D1 to the memory controller 3b in accordance with the control data D3. Then, the memory controller 3b writes the write data D1 in the memory 6b in accordance with the address data D2 (S15).

On the other hand, as shown in FIGS. 6 and 7B, in the case where the duplex controller 14b sends out the second data stored in the RxFIFO 15b (refer to FIG. 2) to the bus B4, the duplex controller 14b gives the message "DMA Men Bus Request" requesting an access to the memory 16b to the arbiter 11b through the bus B4 (S011).

In response to this, the arbiter 11b gives the message "DMA Men Bus Request" to the DMAC 2b (S012). Upon receiving "DMA Men Bus Request", the DMAC 2b gives its confirmation message "ACK" to the arbiter 11b (S013). The arbiter 11b, upon receiving "ACK" from the CPU 1b, transfers "ACK" to the duplex controller 4b (S014). The duplex controller 4b, upon receiving "ACK" from the arbiter 11b, sends out the second data to the bus B4.

In response to this, the DMAC 2b receives the control data D3 (write command) from the bus B4, and gives the write command of the write data D1 to the memory controller 13b in accordance with the control data D3. Then, the memory controller 13b writes the write data D1 in the memory 16b in accordance with the address data D2 (S105).

In this way, since data stored in the duplex control units 4b and 14b is stored in the respective memories 6b and 16b not through the CPU 1b, a period of time required for data write processing can be shortened.

(Action of the Embodiment)

The above-described duplex memory control unit (control units 10a and 10b) is equipped with the bus B1 for the CPU units 1a and the bus B3 for the DMAC 2a. With this structure, an access to the bus B3 by the CPU 1a and an access to the bus B1 by the DMAC 2a are controlled by the arbiter 11a.

As a result, in the case where the CPU 1a accesses to the memory 6a, that is, in the case where the CPU 1a employs the bus B1, the use of the bus B1 by the DMAC 2a is limited. Therefore, a delay of processing by the CPU 1a which is caused by allowing the use of the bus B1 by the CPU 1a to collide with the use of the bus B1 by the DMAC 2a can be prevented. As a result, there is no case in which the data writing process by the CPU 1a is interrupted by the use of the bus B1 by the DMAC 2a as in the prior art.

Likewise, in the case where the DMAC 2a accesses to the memory 16a, that is, in the case where the DMAC 2a employs the bus B3, the use of the bus B3 by the CPU 1a is limited. For that reason, there is no case in which the use of the bus B3 by the CPU 1a collides with the use of the bus B3 by the DMAC 2a.

Also, in the case where the duplex controllers 4a and 14a transfer the write data D1 and the address data D2 to the duplex controllers 4b and 14b, when the write data D1 is I write data or D write data, or when the address data D2 is any one of the I, D and S address data, the transfer of the write data D1 and/or the address data D2 is omitted. As a result, the amount of data transferred from the duplex controller 4a (14a) to the duplex controller 4b (14b) can be reduced. Therefore, a period of time required for transferring data from the control unit 10a to the control unit 10b can be shortened.

Further, in the case where write data D1 or address data D2 can be always omitted such that the first data or the second data always includes the I or D address data, since the width of a bus connecting the control unit 10a and the control unit 10b can be narrowed, the layout of a bus cable within an exchange, etc., is facilitated.

In addition, in the control unit 10b, in the case where the DMAC 2b stores data stored in the respective RxFIFOs 5b and 15b in the memories 3b and 13b, the arbiter 11b limits the use of the bus B2 by the CPU 1b. For that reason, when the DMAC 2b employs the bus B2, there is no case in which the CPU 1b uses the bus B2. Therefore, the interruption and delay of the data writing process by the DMAC 2b which is caused by the use of the bus B2 by the CPU 1b can be prevented.

As was described above, according to the duplex memory control unit (the control unit 10a and the control unit 10b)

according to the present invention, the writing process in the respective control units 10a and 10b can be performed without a delay, and a period of data transmission between the control unit 10a and the control unit 10b can be shortened. With those synergistic effects, the duplex memory control unit can store the same data at the same address in the memory 6a and the memory 6b (the memory 16a and the memory 16b) quicker than the prior art.

Therefore, it is possible to prepare the control unit 10b against a fault of the main system more appropriately than the prior art. That is, the contents stored in the memories 6b and 16b when a fault occurs in the main system can approach the contents stored in the memories 6a and 16a. For that reason, there can be reduced a communication failure which is caused by inconsistency of the contents stored in the memory 6a and the memory 6b (the memory 16a and the memory 16b) when a fault occurs in the main system.

This embodiment exemplifies that the duplex memory control unit is applied to the exchange 100. However, the duplex memory control unit according to the present invention can be widely applied to the mirroring system of data and so on.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A duplex memory control apparatus comprising:
    a first control unit and a second control unit connected to each other through a communication line;
    the first control unit comprising:
        a first bus;
        a first memory connected to the first bus;
        a central processing unit connected to the first bus and writing a write data in the first memory through the first bus;
        a transmitter connected to the first bus, obtaining the write data from the first bus and transmitting the write data to the second control unit or when the write data can be produced based on other write data previously obtained from the first bus in order to transmit to the second control unit, transmitting to the second control unit a specific data comprising information for producing the write data based on the other write data;
        a second bus;
        a first direct memory access unit connected with the second bus and reading the write data stored in the first memory through the first bus and the second bus; and
        an access limiter connected with the first bus and the second bus and limiting use of the first bus by the first direct memory access unit when the central processing unit uses the first bus;
    the second control unit comprising:
        a data producing section receiving the write data or the specific data from the transmitter, having the other write data, and producing the write data based on the specific data and the other write data when receiving the specific data; and
        a second memory storing the write data received or produced by the data producing section.

2. A duplex memory control apparatus as claimed in claim 1, the first control unit further comprising:
    a second bus;
    a third memory connected to the second bus and storing a second write data on the second bus; and
    a second transmitter connected to the second bus, obtaining the second write data from the second bus and transmitting the second write data or when the second write data can be produced based on the other second write data previously obtained from the second bus in order to transmit to the second control unit, transmitting to the second control unit a second specific data comprising information for producing the second write data based on the other second write data;
    the second control unit further comprising:
        a second data producing section receiving the second write data or the second specific data from the second transmitter, having the other second write data, and producing the second write data based on the second specific data and the other second write data when receiving the specific data; and
        a fourth memory storing the second write data received or produced by the second data producing section.

3. A duplex memory control apparatus as claimed in claim 1, the first control unit further comprising:
    a first direct memory access unit connected to the second bus and reading the write data stored in the first memory through the first bus and the second bus; and
    an access limiter connected with the first bus and the second bus and limiting use of the first bus by the first direct memory access unit and/or use of the second bus by the central processing unit.

4. A duplex memory control apparatus as claimed in claim 3, the second control unit further comprising:
    a third bus connecting the data producing section and the second memory;
    a fourth bus connecting to the second data producing section, the fourth memory and a second direct memory access unit;
    a second central processing unit connected to the third bus and using data stored in the second memory through the third bus and the fourth bus; and
    a second access limiter connected to the third bus and the fourth bus and limiting use of the third bus by the second direct memory access unit and/or use of the fourth bus by the second central processing unit.

5. A duplex memory control apparatus as claimed in claim 1, wherein said transmitter, when the write data is obtained by subjecting previous write data obtained before said write data to increment, transmits specific data comprising an indicator that the write data is obtained by subjecting the previous write data to increments.

6. A duplex memory control apparatus as claimed in claim 1, wherein said transmitter, when the write data is obtained by subjecting previous write data obtained before said write data to decrement, transmits specific data comprising an indicator.

7. A duplex memory control apparatus as claimed in claim 1, wherein said transmitter obtains write data and address data indicating a write position in the second memory, and, when the address data is obtained by subjecting previous address data obtained before said address data to increment, transmits specific data comprising an indicator that the address data is obtained by subjecting the previous address data obtained before said address data to increment together with the write data.

8. A duplex memory control apparatus as claimed in claim 1, wherein said transmitter obtains write data and address data indicating a write position in the second memory, and, when the address data is obtained by subjecting previous address data obtained before said address data to decrement, transmits specific data comprising an indicator that the address data is obtained by subjecting the previous address data obtained before said address data to decrement together with the write data.

9. A duplex memory control apparatus used in a communication unit comprising:

a data transmission-path of a main system and a data transmission-path of a sub system, in which a first control unit controlling the data transmission-path of the main system and a second control unit controlling the data transmission-path of the sub system connected to each other through a communication line;

the first control unit comprising:
   a first bus;
   a first memory connected to the first bus;
   a first central processing unit connected to the first bus and writing a main system data relating to the data transmission-path of the main system in the first memory through the first bus;
   a transmitter connected to the first bus, obtaining the main system data from the first bus and transmitting the main system data to the second control unit or when the main system data can be produced based on the other main system data previously obtained from the first bus in order to transmit to the second control unit, transmitting to the second control unit a specific data comprising information for producing the main system data based on the other main system data;
   a second bus;
   a first direct memory access unit connected to the second bus and reading the main system data stored in the first memory through the first bus and second bus; and
   an access limiter connected with the first bus and the second bus and limiting use of the first bus by the first direct memory access unit and/or use of the second bus by the first central processing unit;

the second control unit comprising:
   a third bus;
   a data producing section connected to the third bus, receiving the main system data or the specific data from the transmitter, having the other main system data, and producing the main system data based on the specific data and the other main system data when receiving the specific data;
   a second memory connected to the third bus and storing the main system data received or produced by the data producing section;
   a second central processing unit connected to the third bus and using data stored in the second memory;
   a fourth bus;
   a second direct memory access unit connected to the fourth bus and using data stored in the second memory through the third bus and the fourth bus; and
   a second access limiter connected to the third bus and the fourth bus and limiting use of the third bus by the second direct memory access unit and/or use of the fourth bus by the second central processing unit.

* * * * *